(12) United States Patent
Forbes (10) Patent No.: US 9,771,006 B2
(45) Date of Patent: Sep. 26, 2017

(54) CHILD RESTRAINT

(71) Applicant: Dorel Juvenile Group, Inc., Foxboro, MA (US)

(72) Inventor: William C Forbes, Greenwood, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 188 days.

(21) Appl. No.: 14/713,132

(22) Filed: May 15, 2015

(65) Prior Publication Data

US 2015/0329015 A1 Nov. 19, 2015

Related U.S. Application Data (60) Provisional application No. 61/994,599, filed on May 16, 2014.

(51) Int. Cl.
*B60N 2/28* (2006.01)
*B60N 2/60* (2006.01)
*B60N 2/26* (2006.01)

(52) U.S. Cl.
CPC .......... *B60N 2/2812* (2013.01); *B60N 2/265* (2013.01); *B60N 2/286* (2013.01); *B60N 2/2821* (2013.01); *B60N 2/2845* (2013.01); *B60N 2/2872* (2013.01); *B60N 2/6009* (2013.01)

(58) Field of Classification Search
CPC .......... B60N 2/2812; B60N 2/28; B60N 2/26; B60N 2/2845; B60N 2/2842; B60N 2/2821; B60N 2/265; B60N 2/286; B60N 2/6009; B60N 2/2872

USPC ............................................. 297/250.1, 219.12
See application file for complete search history.

(56) References Cited

U.S. PATENT DOCUMENTS

| | | | | |
|---|---|---|---|---|
| 4,750,783 A | * | 6/1988 | Irby | B60N 2/2848 297/130 |
| 5,673,969 A | * | 10/1997 | Frazier | B60N 2/2806 297/256.15 |
| 5,947,556 A | * | 9/1999 | Strojny | B60N 2/2824 297/130 |
| 6,341,818 B1 | | 1/2002 | Verbovszky et al. | |
| 6,749,258 B1 | * | 6/2004 | Leikin | A47D 13/02 297/219.12 |
| 7,322,647 B2 | * | 1/2008 | Munn | B60N 2/2851 297/250.1 |
| 7,597,396 B2 | * | 10/2009 | Longenecker | B60N 2/2806 297/253 |
| 7,748,780 B2 | | 7/2010 | Sizemore et al. | |
| 6,030,047 C1 | | 1/2014 | Kain | |
| 8,876,208 B2 | | 11/2014 | Heisey et al. | |
| 9,119,483 B1 | | 9/2015 | Heisey | |

(Continued)

FOREIGN PATENT DOCUMENTS

| AU | 2010202448 A1 | 1/2011 |
|---|---|---|
| DE | 19805331 A1 | 8/1998 |

OTHER PUBLICATIONS

PCT International Search Report and Written Opinion completed on Jul. 22, 2015 and issued in connection with PCT/US2015/030985.

*Primary Examiner* — Milton Nelson, Jr.
(74) *Attorney, Agent, or Firm* — Barnes & Thornburg LLP (57) ABSTRACT

A child restraint system includes a juvenile vehicle seat and an infant carrier. The juvenile vehicle seat is adapted to be retained in a stationary position on a passenger seat in a vehicle.

14 Claims, 7 Drawing Sheets

(56) References Cited

U.S. PATENT DOCUMENTS

| | | | |
|---|---|---|---|
| 2003/0189365 A1* | 10/2003 | Alexy | B63B 29/04 |
| | | | 297/250.1 |
| 2010/0078976 A1* | 4/2010 | Hou | B60N 2/2881 |
| | | | 297/230.13 |
| 2010/0225150 A1 | 9/2010 | Duncan et al. | |
| 2011/0074194 A1* | 3/2011 | Weber | B60N 2/2821 |
| | | | 297/256.13 |
| 2011/0298259 A1 | 12/2011 | Heisey | |
| 2012/0261961 A1 | 10/2012 | Heisey et al. | |
| 2012/0319438 A1* | 12/2012 | Kim | B60N 2/2812 |
| | | | 297/163 |

* cited by examiner

CHILD RESTRAINT

PRIORITY CLAIM

This application claims priority under 35 U.S.C. §119(e) to U.S. Provisional Application No. 61/994,599, filed May 16, 2014, which is expressly incorporated by reference herein.

BACKGROUND

The present disclosure relates to a child restraint, and particularly to an infant carrier. More particularly, the present disclosure relates to restraints for holding infants and for holding older juveniles.

SUMMARY

A child restraint in accordance with the present disclosure includes an infant carrier. The infant carrier includes a carrying handle coupled to a seat shell.

In illustrative embodiments, the seat shell includes a child-support base made of a sturdy material and a side wall coupled to the sturdy child-support base and made of a semi-soft pliable material. The carrying handle is also made of a semi-soft, pliable, and flexible material and is coupled to opposite portions of the side wall and arranged to extend up and over a child-receiving cavity bounded by the child-support base and the surrounding side wall.

In illustrative embodiments, the pliable side wall of the seat shell includes a semi-soft first side panel coupled to a first end of the carrying handle and to the child-support base and a semi-soft second side panel coupled to a second end of the flexible carrying handle and to the child-support base. The side wall also includes a foot-and-leg blanket arranged to interconnect bottom portions of the first and second side panels and extend across a seat bottom included in the child-support base to cover the feet and legs of an infant at rest in the child-receiving cavity formed in the seat shell.

In illustrative embodiments, the infant carrier also includes a child-restraint harness coupled to the child-support base. The child-restraint harness is configured to restrain an infant at rest on the child-support base and in the child-receiving cavity formed in the seat shell during transport of the infant carrier by a caregiver gripping the carrying handle.

In illustrative embodiments, the infant carrier also includes a pair of movable shell anchors that are mounted on opposite sides of the child-support base and arranged to project outwardly in opposite directions. Each shell anchor is a spring-loaded slidable plunger that is configured to mate automatically with a companion anchor receiver included in a juvenile vehicle seat without remote activation by a separate anchor controller to retain the infant carrier in a stationary position on a seat bottom of the juvenile vehicle seat and against an upwardly extending seat back of the juvenile vehicle seat. A child-restraint harness included in the juvenile vehicle seat and coupled to the seat bottom and seat back of the juvenile vehicle seat is trapped in an unused position under the seat shell of the infant carrier and in front of the seat bottom and back of the juvenile vehicle seat when the infant carrier is mounted on the juvenile vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of an occupied infant carrier before it is mounted in a child-seating space formed in a juvenile vehicle seat that is adapted to be anchored to a passenger seat in a vehicle and showing that the infant carrier includes (1) a child-support base located under the infant occupying the infant carrier and sized to fit into the child-seating space formed in the juvenile vehicle seat and rest on the seat bottom and seat back of the juvenile seat, (2) a side wall made of a pliable material and coupled to the child-support base to form a seat shell providing a child-receiving cavity in which an infant has been placed, (3) a carrying handle coupled to opposing semi-soft side panels included in the side wall, (4) a child-restraint harness coupled to the child-support base, and (5) a first shell anchor coupled to a side edge of the child-support base of the seat shell and configured to mate quickly and easily with a companion first receiver included in a side wall of the juvenile vehicle seat to retain the infant carrier in a stationary position in the child-seating space provided in the juvenile vehicle seat as shown, for example, in FIG. 2;

DETAILED DESCRIPTION

Figure 1:
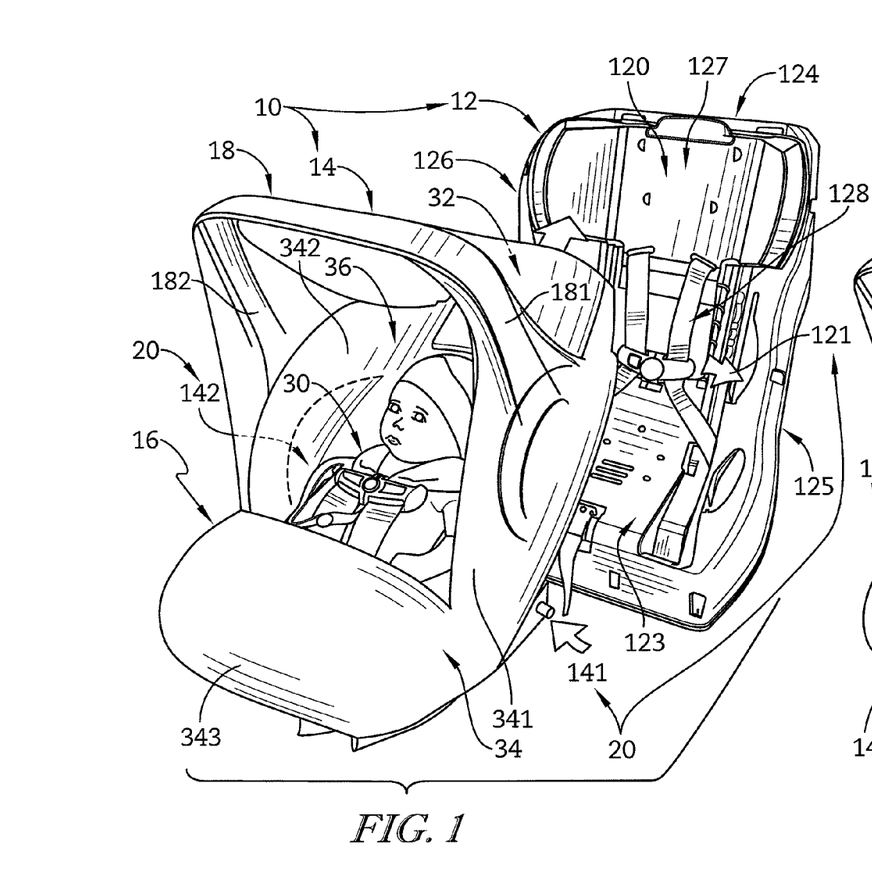
Figure 2:
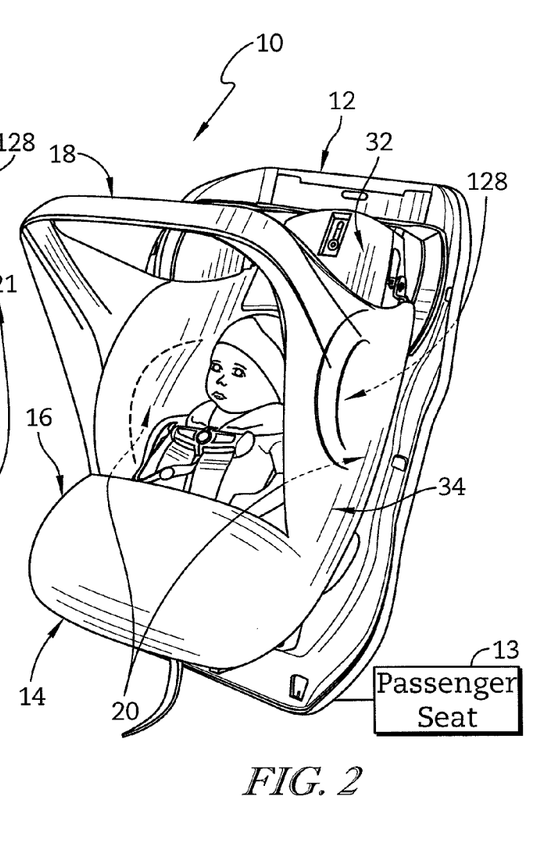
FIG. 2 is a perspective view similar to FIG. 1 showing the infant carrier after it has been mounted in a child-receiving space formed in the juvenile vehicle seat to cover a separate child-restraint harness included in the juvenile vehicle seat and coupled to the juvenile vehicle seat to restrain an older child seated in the juvenile vehicle seat when the infant carrier is not coupled to the juvenile vehicle seat.
Figure 3:
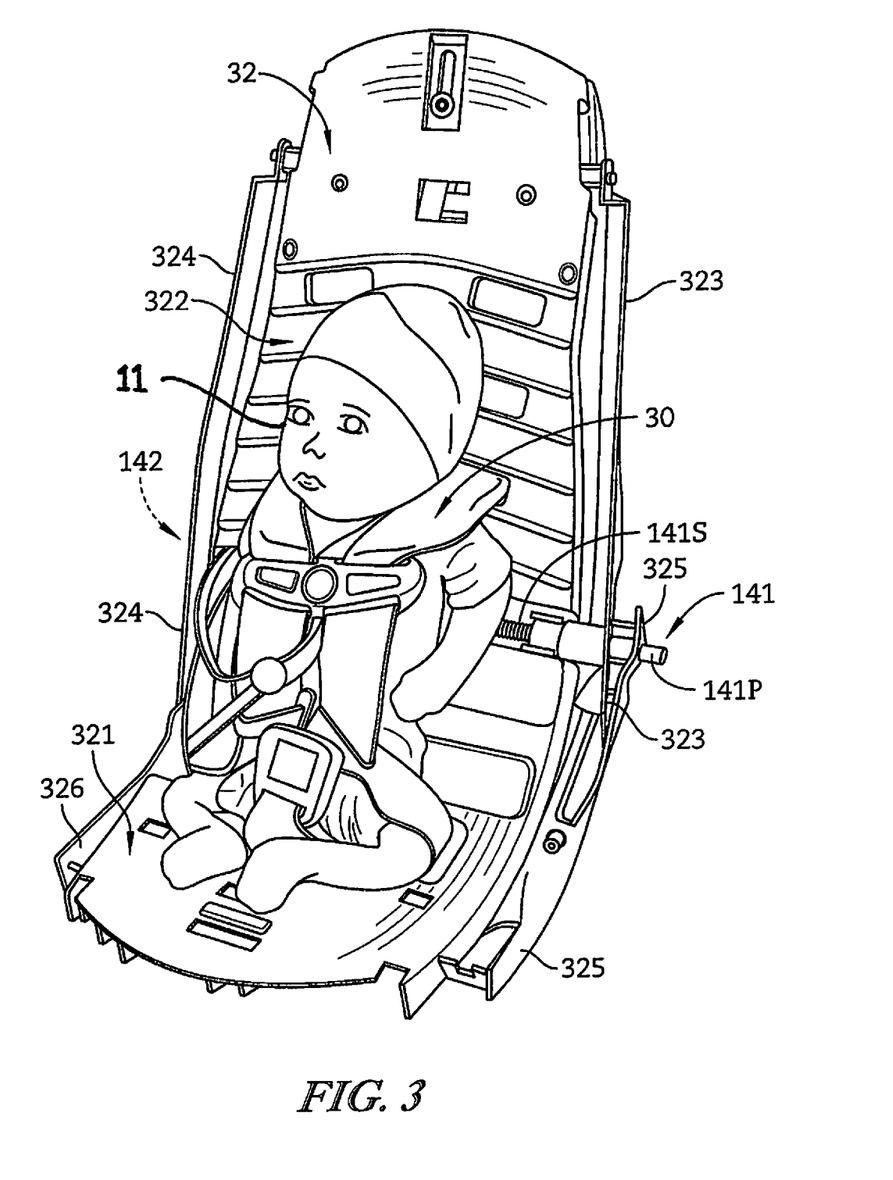
FIG. 3 is a perspective view of an infant restrained on the child-support base of the infant carrier before the infant carrier is mounted on a companion juvenile vehicle seat and showing that the first shell anchor shown in FIG. 1 comprises a spring-loaded slidable plunger extending outwardly through an aperture formed in the child-support base so that it can be extended into a blind hole defined by the first anchor receiver formed in side wall of the companion juvenile vehicle seat as suggested in FIG. 5 when the infant carrier is mounted on the juvenile vehicle seat.
Figure 4:
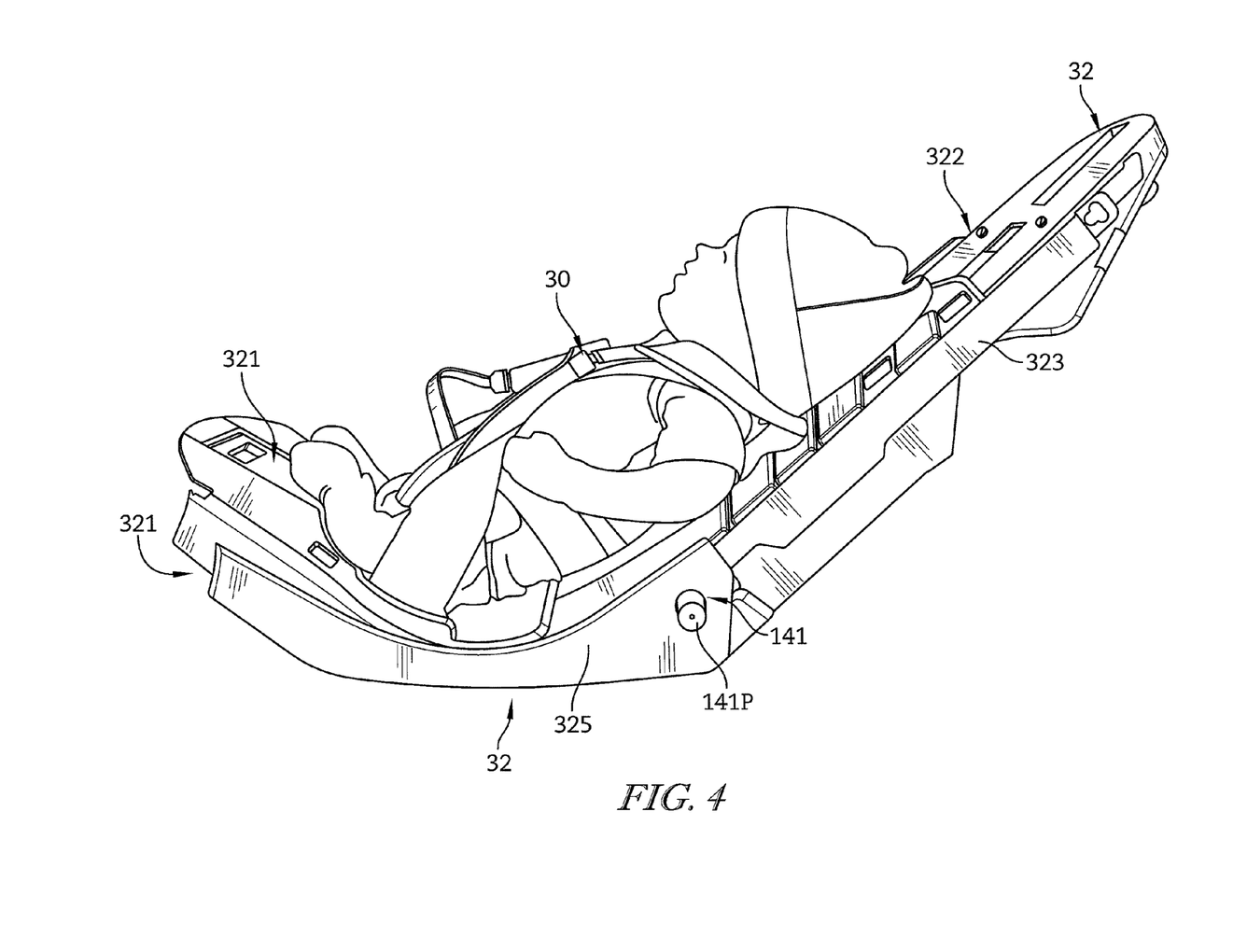
FIG. 4 is an enlarged side elevation view of the infant carrier of FIG. 3 showing that the child-support base includes a seat bottom and a seat back arranged to extend upwardly away from the seat bottom and showing that the child-restraint harness is coupled to the seat bottom and back and that the first shell anchor is arranged to lie alongside the seat back.

A child restraint 10 in accordance with the present disclosure includes a juvenile vehicle seat 12 and an infant carrier 14 that can be used independently as suggested in FIG. 1 or mounted on juvenile vehicle seat 12 as suggested in FIGS. 1 and 2. Juvenile vehicle seat 12 is adapted to rest on and be tethered to a passenger seat in a vehicle to provide a seat for older children or a foundation on which infant carrier 14 can be anchored quickly and easily in accordance with the present disclosure. Infant carrier 14 comprises a seat shell 16 and a carrying handle 18 coupled to seat shell 16 to permit a caregiver to transport an infant 11 at rest in seat shell 16 away from juvenile vehicle seat 12.

Figure 5:
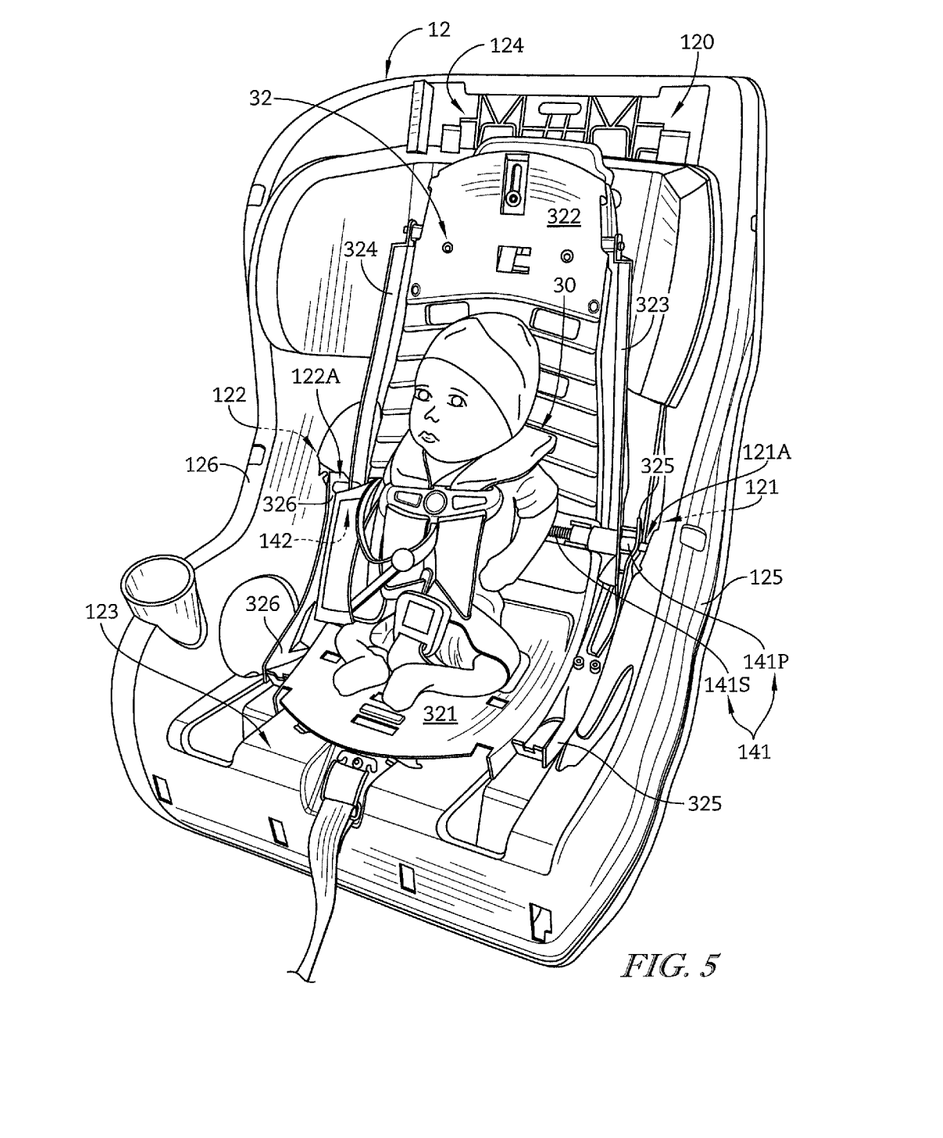
FIG. 5 is a perspective view of the infant carrier of FIGS. 3 and 4 mounted in the child-receiving space formed in the juvenile vehicle seat of FIG. 1.
Figure 6:
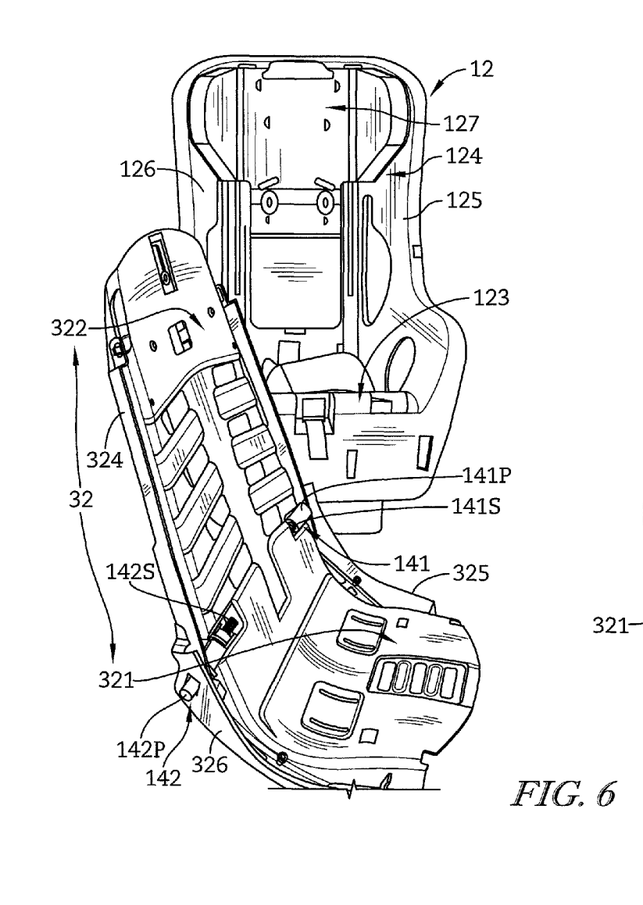
FIGS. 6 and 7 are perspective views of the child-support base shown in FIGS. 3-5 and showing that the first shell anchor is provided on a first side of the child-support base and that a second shell anchor is provided on an opposite second side of the child-support base.
Figure 7:
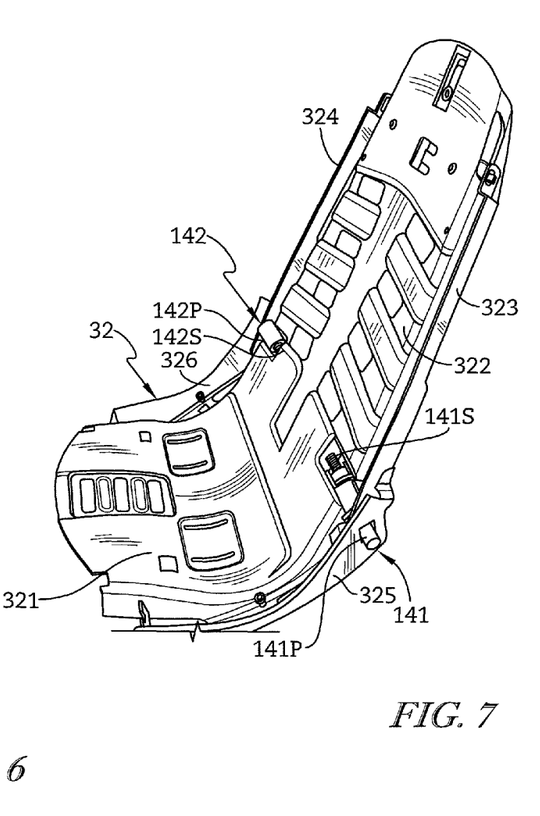

Child restraint 10 includes quick-connect means 20 for retaining infant carrier 14 in a stationary position in a child-seating space 120 provided in juvenile vehicle seat 12 as suggested in FIGS. 1, 2, and 5 so that an occupied infant carrier 14 can be mounted quickly and easily on a juvenile vehicle seat 12 that is already at rest in a stationary position on a passenger seat in a vehicle. In illustrative embodiments, the quick-connect means 20 comprises a movable first shell anchor 141 included in infant carrier 14 and coupled to a first side of seat shell 16 and a companion first anchor receiver 121 formed in one side of juvenile vehicle seat 12 to receive first shell anchor 141 when infant carrier 14 is mounted on juvenile vehicle seat 12 as suggested in FIGS. 1, 5, and 8. Quick-connect means 20 also comprises a movable second shell anchor 142 included infant carrier 14 and coupled to an opposite second side of seat shell 16 and a companion second anchor receiver. 122 formed in another side of juvenile vehicle seat 12 to receive second shell anchor 142 when infant carrier 14 is mounted on juvenile vehicle seat 12 as suggested in FIGS. 5 and 8.

Juvenile vehicle seat 12 includes a seat bottom 123, a seat back 124 arranged to extend upwardly from seat bottom 123, a first side wall 125 coupled to one side of seat bottom and back 123, 124, and a second side wall 126 coupled to an opposite side of seat bottom and back 123, 124 to form a child-seating space 120 therebetween as shown, for example, in FIG. 1. First side wall 125 of juvenile vehicle seat 12 is formed to include first anchor receiver 121 as suggested in FIGS. 1, 5, and 8. Second side wall 126 of juvenile vehicle seat 12 is formed to include second anchor receiver 122 as suggested in FIGS. 5 and 8. In illustrative embodiments, juvenile vehicle seat 12 also includes a headrest 127 mounted for up-and-down movement on seat back 124 under the control of a caregiver to account for increasing size of a growing child using juvenile vehicle seat 12 and a child-restraint harness 128 coupled at a lower-end thereof to seat back 124 and at an upper end thereof to movable headrest 127 as suggested in FIG. 1.

Infant carrier 14 includes seat shell 16, carrying handle 18, and a child-restraint harness 30, as shown, for example, in FIG. 1. Infant carrier 14 also includes a movable first shell anchor 141 coupled to a first side of seat shell 16 as suggested in FIGS. 1 and 3-8 and a movable second shell anchor 142 coupled to an opposite second side of seat shell 16 as suggested in FIGS. 5-8.

Seat shell 16 includes a child-support base 32 and a side wall 34 coupled to child-support base 32 to define a child-receiving cavity 36 as shown, for example, in FIGS. 1 and 2. First and second shell anchors 141, 142 are coupled to child-support base 32 as shown, for example, in FIGS. 6 and 7.

Child-support base 32 of seat shell 16 is made of a sturdy material and includes a seat bottom 321 and a seat back 322 arranged to extend upwardly from seat bottom 321. First and second shell anchors 141, 142 are coupled to seat back 322 of child-support base 32 as shown, for example, in FIGS. 6 and 7.

Figure 9:
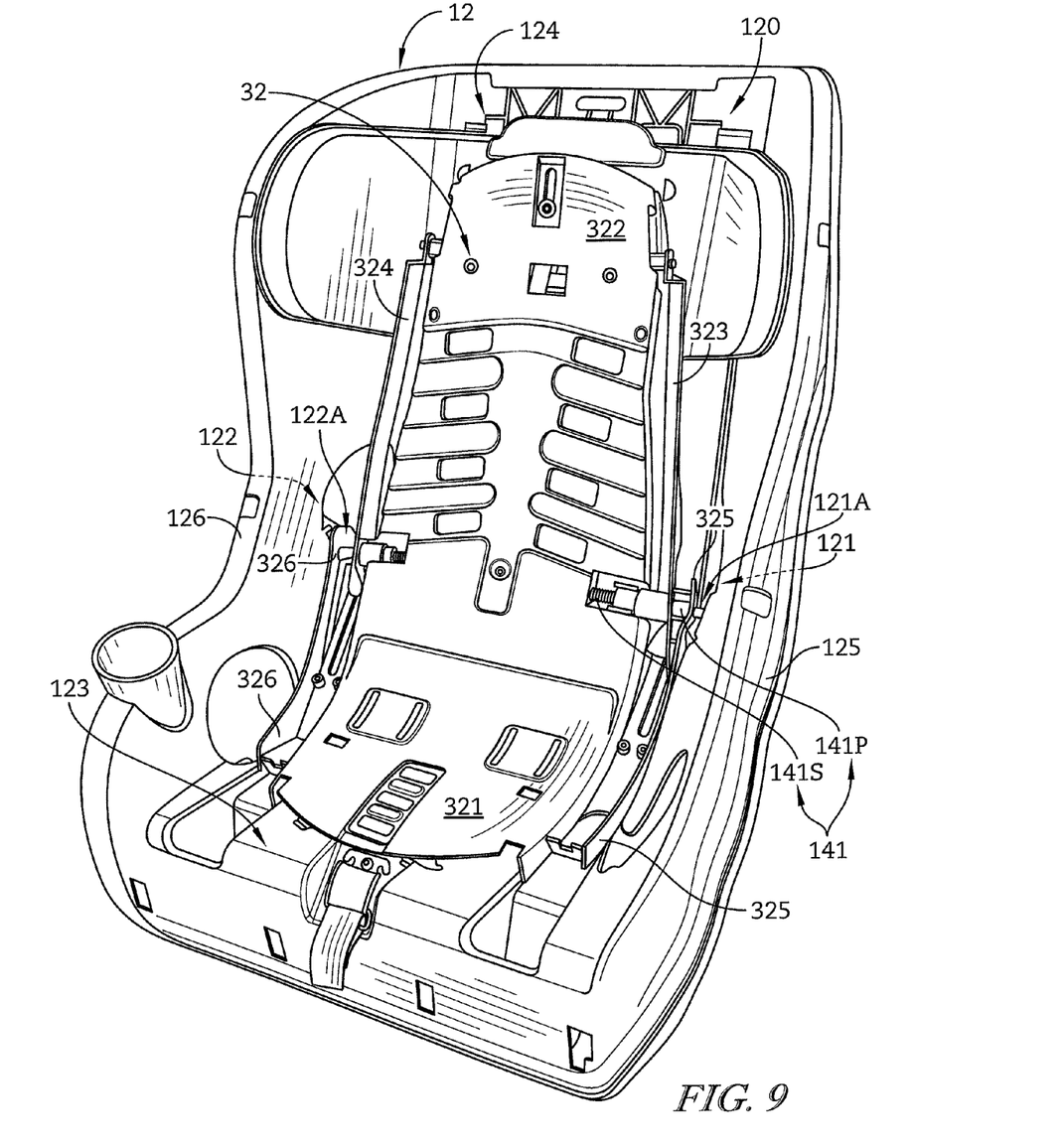
FIG. 9 is a perspective view similar to FIG. 8 taken from another point of view and omitting the child-restraint harness associated with the infant carrier.

Child-support base 32 also includes a first upper rail 323, a second upper rail 324, a first lower rail 325, and a second lower rail 326 as suggested in FIG. 9. Seat bottom 321, seat back 322, and first and second lower rails 325, 326 cooperate to form a monolithic component. An upper end of first upper rail 323 is coupled to one side of seat back 322 while a lower end of first upper rail 323 is coupled to an upper end of first lower rail 325. An upper end of second upper rail 324 is coupled to an opposite second side of seat back 322 while a lower end of second upper rail 324 is coupled to an upper end of second lower rail 325. Portions of first slidable plunger 141P extend through aligned apertures formed in the first upper and lower rails 323, 325 as suggested in FIG. 9. Portions of second slidable plunger 142P extend through aligned apertures formed in the second upper and lower rails 324, 326 as suggested in FIG. 9.

Side wall 34 of seat shell 16 is made of a semi-soft and pliable material in illustrative embodiments. Side wall 34 includes a semi-soft first side panel 341 coupled to a first end 181 of carrying handle 18 and located alongside a first side of child-support base 32, a semi-soft second side panel 342 coupled to a second end 182 of carrying handle 18 and located alongside a second side of child-support base 32, and a foot-and-leg blanket 343 as shown, for example, in FIGS. 1 and 2. Foot-and-leg blanket 343 is arranged to connect bottom portions of first and second side panels 341, 342 and extend across seat bottom 321 of child-support base 32 to cover the feet and legs of an infant at rest in child-receiving cavity 36 formed in seat shell 16.

First shell anchor 141 of infant carrier 14 is mounted for movement relative to child-support base 32 during installation of infant carrier 14 in a mounted position in child-seating space 120 formed in juvenile vehicle seat 12. First shell anchor 141 is arranged to extend into the companion anchor receiver 121 that is formed, for example, in first side wall 125 of juvenile vehicle seat 12 when infant carrier 14 is placed by a caregiver in a predetermined position in child-seating space 120 as suggested in FIGS. 5 and 8. In an illustrative embodiment, first shell anchor 141 includes a slidable plunger 141P biased outwardly by a spring 141S away from seat back 322 of child-support base 32 of seat shell 16 to move along a plunger-movement line through a channel formed in seat shell 16 into a first blind hole that is formed in first side wall 125 to define first anchor receiver 121. Spring 141S and a portion of slidable plunger 141P are arranged to lie in a first channel 322C 1 formed in seat back 322 as shown, for example, in FIGS. 5-7. Plunger 141P is pushed inwardly to compress spring 141S when engaging first side wall 125 during mounting of infant carrier 14 on juvenile vehicle seat 12 and then moved outwardly by spring 141S into anchor receiver 121 when plunger 141P is aligned with anchor receiver 121.

Second shell anchor 142 of infant carrier 14 is mounted for movement relative to child-support base 32 during installation of infant carrier 14 in a mounted position in child-seating space 120 formed in juvenile vehicle seat 12. Second shell anchor 142 is arranged to extend into the companion anchor receiver 122 that is formed, for example, in second side wall 126 of juvenile vehicle seat 12 when infant carrier 14 is placed by a caregiver in a predetermined position in child-seating space 120 as suggested in FIG. 8. In an illustrative embodiment, second shell anchor 142 includes a slidable plunger 142P biased outwardly by a spring 142S away from seat back 322 of child-support base 32 of seat shell 16 to move along a plunger-movement line through a channel formed in seat shell 16 into a second blind hole that is formed in second side wall 126 to define second anchor receiver 142. Spring 142S and a portion of slidable plunger 142P are arranged to lie in a second channel 322C2 formed in seat back 322 as shown, for example, in FIG. 8. Plunger 142P is pushed inwardly to compress spring 142S when engaging second side wall 126 during mounting of infant carrier 14 on juvenile vehicle sent 12 and then moved outwardly by spring 142S into anchor recover 122 when plunger 142P is aligned with anchor receiver 122.

A child restraint system 10 includes a juvenile vehicle seat 12 and an infant carrier 14 as suggested in FIGS. 1 and 2. Juvenile vehicle seat 12 is adapted to rest on a passenger seat 13 in a vehicle (not shown) as suggested diagrammatically in FIG. 2. Infant carrier 14 includes a seat shell 16 and a carrying handle 18 coupled to the seat shell 16 as also suggested in FIGS. 1 and 2.

Figure 8:
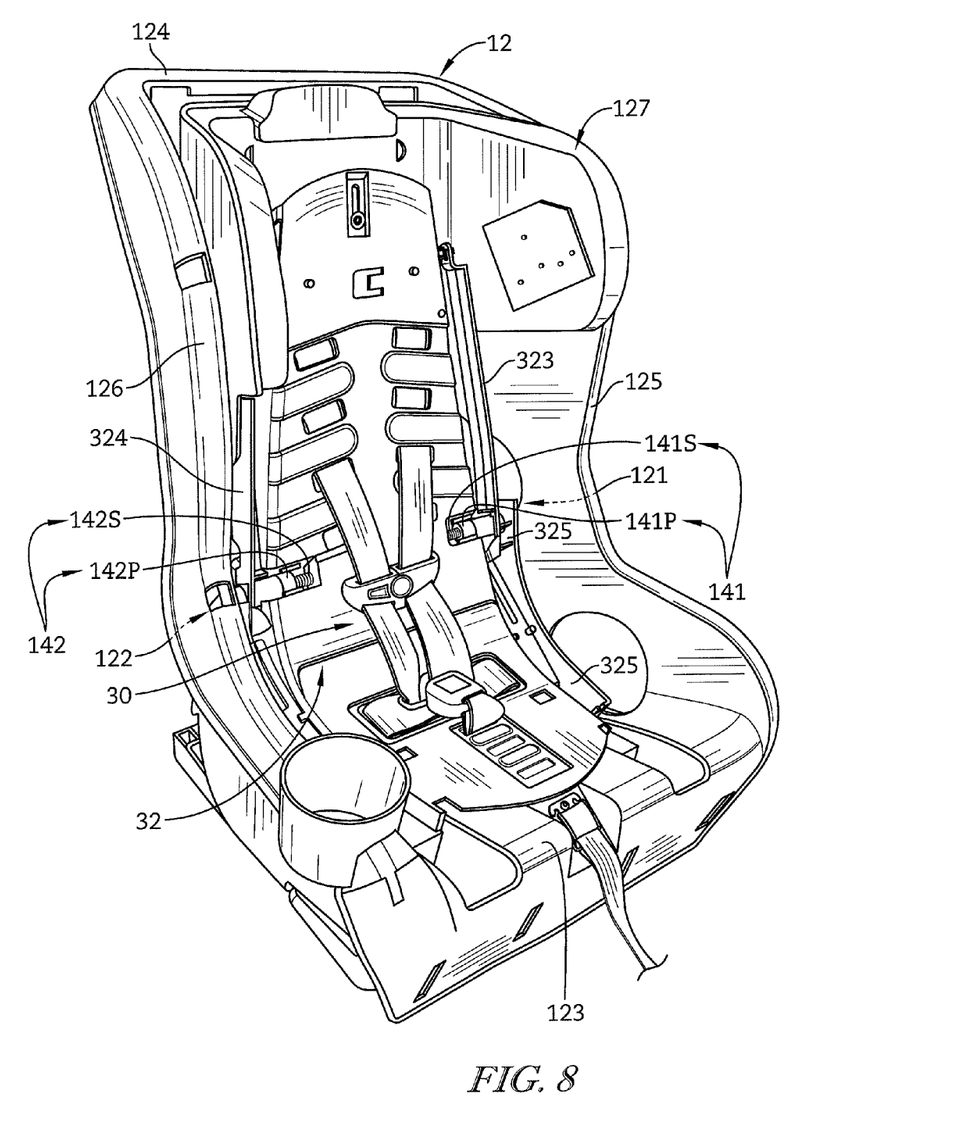
FIG. 8 is a perspective view similar to FIG. 5 without a seated infant and from a different point of view showing mating engagement of a first shell anchor located on a far side of the child-support base and a companion first anchor receiver formed in a far side wall of the juvenile vehicle seat and showing mating engagement of a second shell anchor located on a near side of the child-support base and a companion second anchor receiver formed in a near side wall of the juvenile vehicle seat.

Juvenile vehicle seat 12 includes a seat bottom 123, a seat back 124 arranged to extend upwardly away from seat bottom 123, a first side wall 125 coupled to one side of seat bottom 123 and seat back 124 and formed to include a first anchor receiver 121, and a second side wall 126 coupled to an opposite second side of seat bottom 123 and seat back 124 and formed to include a second anchor receiver 122 as suggested in FIGS. 1 and 8. First and second side walls 125, 126 are arranged to lie in spaced-apart relation to one another to form a child-receiving space 120 therebetween as suggested in FIG. 1.

Seat shell 16 includes a child-support base 32, a first shell anchor 141 coupled to a first side of child-support base 32, and a second shell anchor 142 coupled to an opposite second side of child-support base 32 as suggested in FIGS. 1 and 8. First shell anchor 141 is arranged to extend into the first anchor receiver 121 formed in the first side wall 125 of juvenile vehicle seat 12 when infant carrier 14 is placed in a stationary predetermined position in child-seating space 120 formed in juvenile vehicle seat 12 to align child-support base 32 of seat shell 16 in closely confronting relation to seat bottom 123 and seat back 124 of juvenile vehicle seat 12 in the child-seating space 120 formed in juvenile vehicle seat 12 to establish an aligned position of child-support base 32 of seat shell 16 of infant carrier 14 relative to juvenile vehicle seat 12. Second shell anchor 142 is arranged to extend into the second anchor receiver 122 formed in second side wall 126 of juvenile vehicle seat 12 when infant carrier 14 is placed in the stationary predetermined position in the child-seating space 120 formed in juvenile vehicle seat 12 to retain child-support base 32 of seat shell 16 in the aligned position.

Juvenile vehicle seat 12 further includes a child-restraint harness 128 coupled at least to seat back 124 of the juvenile vehicle seat 12 as suggested in FIG. 1. Child-support base 32 of seat shell 16 of infant carrier 14 includes a seat bottom 321 and a seat back 322 as suggested in FIG. 3. A portion of child-restraint harness 128 is located between the seat back 322 of child-support base 32 and the seat back 124 of juvenile vehicle seat 12 when the child-support base 32 is retained in the aligned position in juvenile vehicle seat 12 in response to engagement of first shell anchor 141 in first anchor receiver 121 and engagement of second shell anchor 142 in second anchor receiver 122 as suggested in FIGS. 1 and 2. Seat back 322 of child-support base 32 is arranged to lie between the portion of the child-restraint harness 128 and the carrying handle 18 of infant carrier 14 when child-support base 32 is retained in the aligned position on juvenile vehicle seat 12 as suggested in FIGS. 1 and 2.

First anchor receiver 121 is formed to include an inlet aperture 121A arranged to open into the child-seating space 120 and sized to receive a free end of the first shell anchor 141 during insertion of child-support base 32 into the child-seating space 120 formed in juvenile vehicle seat 12 as suggested in FIG. 5. Second anchor receiver 122 is formed to include an inlet aperture 122A arranged to open into the child-seating space 120 and sized to receive a free end of the second shell anchor 142 during insertion of child-support base 32 into the child-seating space 120 formed in juvenile vehicle seat 12 as suggested in FIG. 5. First and second shell anchors 141, 142 are coupled to seat back 322 of child-support base 32.

Seat shell 16 further includes a side wall 124 coupled to child-support base 32 to form a child-receiving cavity 36 in infant carrier 14 as suggested in FIGS. 1 and 2. Side wall 34 includes a semi-soft first side panel 341 coupled to a first end 181 of the carrying handle 18 and located alongside a first side of the child-support base 32, a semi-soft second side panel 342 coupled to a second end 182 of the carrying handle 18 and located along a second side of the child-support base 32, and a foot-and-leg blanket 343 as suggested in FIG. 1. Foot-and-leg blanket 343 is arranged to connect bottom portions of the first and second side panels 341, 342 and extend across seat bottom 321 of child-support base 32 to cover feet and legs of an infant at rest in the child-receiving cavity 36 formed in seat shell 16 as suggested in FIGS. 1 and 2.

First shell anchor 141 is arranged to lie below and in spaced-apart relation to the first side panel 341 of side wall 34 as suggested in FIG. 1. Second shell anchor 142 is arranged to lie below and in spaced-apart relation to the second side panel 342 of side wall 34 as suggested in FIG. 1.

Each of the first and second shell anchors 141, 142 of seat shell 16 is mounted for independent movement relative to child-support base 32 during installation of infant carrier 14 in a mounted position in the child-seating space 120 formed in juvenile vehicle seat 12. First shell anchor 141 includes a first spring 141S and a first slidable plunger 141P biased outwardly by the first spring 141S away from the child-support base 32 to move independently along a first plunger-movement line through a first channel formed in the seat shell 16 into a first blind hole that is formed in the first side wall 125 of the juvenile vehicle seat 12 to define the first anchor receiver 121. Second shell anchor 142 includes a second spring 142S and a second slidable plunger 142P biased and outwardly by the second spring 142P away from the child-support base 32 to move independently along a second plunger-movement line through a second channel formed in the seat shell 16 into a second blind hole that is formed in the second side wall 126 of the juvenile vehicle seat 12 to define the second anchor receiver 122.

First spring 141S and a portion of the first slidable plunger 141P are arranged to lie in a first channel formed in the seat back 322 of the child-support base 32. First slidable plunger 141P is pushed inwardly to compress the first spring 141S when engaging the first side wall 125 of juvenile vehicle seat 12 during mounting of infant carrier 14 on juvenile vehicle seat 12 and is moved outwardly by the first spring 141S into the first anchor receiver 121 when the first slidable plunger 141P is aligned with the first anchor receiver 121 once child-support base 32 is placed in the aligned position.

Second spring 142S and a portion of the second slidable plunger 142P are arranged to lie in a second channel formed in the seat back 322 of the child-support base 32. Second slidable plunger 142P is pushed inwardly to compress the second spring 142S when engaging the second side wall 126 of juvenile vehicle seat 12 during mounting of infant carrier 14 on juvenile vehicle seat 12 and is moved outwardly by the second spring 142S into the second anchor receiver 122 when the second slidable plunger 142P is aligned with the second anchor receiver 122 once child-support base 32 is placed in the aligned position.

Child-support base 32 is made of a sturdy material. Seat shell 16 further includes a side wall 34 coupled to the child-support base 32 and made of a semi-soft pliable material. Carrying handle 18 is made of a semi-soft pliable material and is coupled to opposite portions 341, 342 of the side wall 34 and arranged to extend up and over a child-receiving cavity 36 bounded by the child-support base 32 and the surrounding side wall 34.

Child-restraint harness 128 is included in the juvenile vehicle seat 12 as suggested in FIG. 1. Child-restraint harness 128 is coupled to the seat bottom 123 and the seat back 124 of the juvenile vehicle seat 12. Child-restraint harness 128 is trapped in an unused position under seat shell 16 of infant carrier 14 and between seat shell 16 and seat bottom 123 and seat back 124 of juvenile vehicle seat 12 when infant carrier 14 is retained in a stationary position on juvenile vehicle seat 12 in response to extension of the first shell anchor 141 into the first anchor receiver 121 and extension of the second shell anchor 142 into the second anchor receiver 122.

The invention claimed is:

1. A child restraint system comprising
a juvenile vehicle seat adapted to rest on a passenger seat in a vehicle, the juvenile vehicle seat including a seat bottom, a seat back arranged to extend upwardly away from the seat bottom, a first side wall coupled to one side of the seat bottom and back and formed to include a first anchor receiver, and a second side wall coupled to an opposite second side of the seat bottom and back and formed to include a second anchor receiver, the first and second side walls being arranged to lie in spaced-apart relation to one another to form a child-seating space therebetween, and
an infant carrier including a seat shell and a carrying handle coupled to the seat shell, the seat shell including a child-support base, a first shell anchor coupled to a first side of the child-support base and arranged to extend into the first anchor receiver formed in the first side wall of the juvenile vehicle seat when the infant carrier is placed in a predetermined position in the child-seating space formed in the juvenile vehicle seat to align the child-support base of the seat shell in closely confronting relation to the seat bottom and the seat back of the juvenile vehicle seat in the child-seating space formed in the juvenile vehicle seat to establish an aligned position of the child-support base of the seat shell of the infant carrier relative to the juvenile vehicle seat, and a second shell anchor coupled to an opposite second side of the child-support base and arranged to extend into the second anchor receiver formed in the second side wall of the juvenile vehicle seat when the infant carrier is placed in the predetermined position in the child-seating space formed in the juvenile vehicle seat to retain the child-support base of the seat shell in the aligned position,
wherein the seat shell further includes a side wall coupled to the child-support base to form a child-receiving cavity in the infant carrier, the side wall includes a semi-soft first side panel coupled to a first end of the carrying handle and located alongside a first side of the child-support base, a semi-soft second side panel coupled to a second end of the carrying handle and located along a second side of the child-support base, and a foot-and-leg blanket arranged to connect bottom portions of the first and second side panels and extend across the seat bottom of the child-support base to cover feet and legs of an infant at rest in the child-receiving cavity formed in the seat shell.

2. The child restraint system of claim 1, wherein the first shell anchor is arranged to lie below and in spaced-apart relation to the first side panel and the second shell anchor is arranged to lie below and in spaced-apart relation to the second side panel.

3. A child restraint system comprising
a juvenile vehicle seat adapted to rest on a passenger seat in a vehicle, the juvenile vehicle seat including a seat bottom, a seat back arranged to extend upwardly away from the seat bottom, a first side wall coupled to one side of the seat bottom and back and formed to include a first anchor receiver, and a second side wall coupled to an opposite second side of the seat bottom and back and formed to include a second anchor receiver, the first and second side walls being arranged to lie in spaced-apart relation to one another to form a child-seating space therebetween, and
an infant carrier including a seat shell and a carrying handle coupled to the seat shell, the seat shell including a child-support base, a first shell anchor coupled to a first side of the child-support base and arranged to extend into the first anchor receiver formed in the first side wall of the juvenile vehicle seat when the infant carrier is placed in a predetermined position in the child-seating space formed in the juvenile vehicle seat to align the child-support base of the seat shell in closely confronting relation to the seat bottom and the seat back of the juvenile vehicle seat in the child-seating space formed in the juvenile vehicle seat to establish an aligned position of the child-support base of the seat shell of the infant carrier relative to the juvenile vehicle seat, and a second shell anchor coupled to an opposite second side of the child-support base and arranged to extend into the second anchor receiver formed in the second side wall of the juvenile vehicle seat when the infant carrier is placed in the predetermined position in the child-seating space formed in the juvenile vehicle seat to retain the child-support base of the seat shell in the aligned position,
wherein each of the first and second shell anchors of the seat shell is mounted for movement relative to the child-support base during installation of the infant carrier in a mounted position in the child-seating space formed in the juvenile vehicle seat, the first shell anchor includes a first spring and a first slidable plunger biased outwardly by the first spring away from the child-support base to move along a first plunger-movement line through a first channel formed in the seat shell into a first blind hole that is formed in the first side wall of the juvenile vehicle seat to define the first anchor receiver and the second shell anchor includes a second spring and a second slidable plunger biased outwardly by the second spring away from the child-support base to move along a second plunger-movement line through a second channel formed in the seat shell into a second blind hole that is formed in the second side wall of the juvenile vehicle seat to define the second anchor receiver.

4. The child restraint system of claim 3, wherein the child-support base includes a seat bottom and a seat back and the first spring and a portion of the first slidable plunger are arranged to lie in a first channel formed in the seat back of the child-support base and the first slidable plunger is pushed inwardly to compress the first spring when engaging the first side wall of the juvenile vehicle seat during mounting of the infant carrier on the juvenile vehicle seat and is moved outwardly by the first spring into the first anchor receiver when the first slidable plunger is aligned with the first anchor receiver.

5. The child restraint system of claim 4, wherein the second spring and a portion of the second slidable plunger are arranged to lie in a second channel formed in the seat back of the child-support base and the second slidable plunger is pushed inwardly to compress the second spring when engaging the second side wall of the juvenile vehicle seat during mounting of the infant carrier on the juvenile vehicle seat and is moved outwardly by the second spring into the second anchor receiver when the second slidable plunger is aligned with the second anchor receiver.

6. A child restraint system comprising
a juvenile vehicle seat adapted to rest on a passenger seat in a vehicle, the juvenile vehicle seat including a seat bottom, a seat back arranged to extend upwardly away from the seat bottom, a first side wall coupled to one side of the seat bottom and back and formed to include a first anchor receiver, and a second side wall coupled to an opposite second side of the seat bottom and back and formed to include a second anchor receiver, the first and second side walls being arranged to lie in spaced-apart relation to one another to form a child-seating space therebetween, and
an infant carrier including a seat shell and a carrying handle coupled to the seat shell, the seat shell including a child-support base, a first shell anchor coupled to a first side of the child-support base and arranged to extend into the first anchor receiver formed in the first side wall of the juvenile vehicle seat when the infant carrier is placed in a predetermined position in the child-seating space formed in the juvenile vehicle seat to align the child-support base of the seat shell in closely confronting relation to the seat bottom and the seat back of the juvenile vehicle seat in the child-seating space formed in the juvenile vehicle seat to establish an aligned position of the child-support base of the seat shell of the infant carrier relative to the juvenile vehicle seat, and a second shell anchor coupled to an opposite second side of the child-support base and arranged to extend into the second anchor receiver formed in the second side wall of the juvenile vehicle seat when the infant carrier is placed in the predetermined position in the child-seating space formed in the juvenile vehicle seat to retain the child-support base of the seat shell in the aligned position,
wherein the child-support base is made of a sturdy material, the seat shell further includes a side wall coupled to the child-support base and made of a semi-soft pliable material, and the carrying handle is made of a semi-soft pliable material and is coupled to opposite portions of the side wall and arranged to extend up and over a child-receiving cavity bounded by the child-support base and the surrounding side wall.

7. The child restraint system of claim 6,
wherein the side wall includes a semi-soft first side panel coupled to a first end of the carrying handle and located alongside a first side of the child-support base, a semi-soft second side panel coupled to a second end of the carrying handle and located along a second side of the child-support base, and a foot-and-leg blanket arranged to connect bottom portions of the first and second side panels and extend across the seat bottom of the child-support base to cover feet and legs of an infant at rest in the child-receiving cavity formed in the seat shell.

8. A child restraint system comprising
a juvenile vehicle seat adapted to rest on a passenger seat in a vehicle, the juvenile vehicle seat including a seat bottom, a seat back arranged to extend upwardly away from the seat bottom, a first side wall coupled to one side of the seat bottom and back and formed to include a first anchor receiver, and a second side wall coupled to an opposite second side of the seat bottom and back and formed to include a second anchor receiver, the first and second side walls being arranged to lie in spaced-apart relation to one another to form a child-seating space therebetween, and
an infant carrier including a seat shell and a carrying handle coupled to the seat shell, the seat shell including a child-support base, a first shell anchor coupled to a first side of the child-support base and arranged to extend into the first anchor receiver formed in the first side wall of the juvenile vehicle seat when the infant carrier is placed in a predetermined position in the child-seating space formed in the juvenile vehicle seat to align the child-support base of the seat shell in closely confronting relation to the seat bottom and the seat back of the juvenile vehicle seat in the child-seating space formed in the juvenile vehicle seat to establish an aligned position of the child-support base of the seat shell of the infant carrier relative to the juvenile vehicle seat, and a second shell anchor coupled to an opposite second side of the child-support base and arranged to extend into the second anchor receiver formed in the second side wall of the juvenile vehicle seat when the infant carrier is placed in the predetermined position in the child-seating space formed in the juvenile vehicle seat to retain the child-support base of the seat shell in the aligned position,
wherein the child-support base includes a seat bottom that is aligned in closely confronting relation to the seat bottom of the juvenile vehicle seat when the child-support base is retained in the aligned position and a seat back that is aligned in closely confronting relation to the seat back of the juvenile vehicle seat when the child-support base is retained in the aligned position, and the first and second shell anchors are coupled to the seat back of the child-support base, and
wherein the first shell anchor includes a first spring and a first slidable plunger biased outwardly by the first spring away from the child-support base, the first spring and a portion of the first slidable plunger are arranged to lie in a first channel formed in the seat back of the child-support base, and the first slidable plunger is pushed inwardly to compress the first spring when engaging the first side wall of the juvenile vehicle seat during mounting of the infant carrier on the juvenile vehicle seat and is moved outwardly by the first spring into the first anchor receiver when the first slidable plunger is aligned with the first anchor receiver.

9. The child restraint system of claim 8, wherein the second shell anchor includes a second spring and a second slidable plunger biased outwardly away from the child-support base, the second spring and a portion of the second slidable plunger are arranged to lie in a second channel formed in the seat back of the child-support base, and the second slidable plunger is pushed inwardly to compress the second spring when engaging the second side wall of the juvenile vehicle seat during mounting of the infant carrier on the juvenile vehicle seat and is moved outwardly by the second spring into the second anchor receiver when the second slidable plunger is aligned with the second anchor receiver.

10. A child restraint system comprising
a juvenile vehicle seat adapted to rest on a passenger seat in a vehicle, the juvenile vehicle seat including a seat bottom, a seat back arranged to extend upwardly away from the seat bottom, a first side wall coupled to one side of the seat bottom and back and formed to include a first anchor receiver, and a second side wall coupled to an opposite second side of the seat bottom and back and formed to include a second anchor receiver, the first and second side walls being arranged to lie in spaced-apart relation to one another to form a child-seating space therebetween, and
an infant carrier including a seat shell and a carrying handle coupled to the seat shell, the seat shell including a child-support base, a first shell anchor coupled to a first side of the child-support base and arranged to extend into the first anchor receiver formed in the first side wall of the juvenile vehicle seat when the infant carrier is placed in a predetermined position in the child-seating space formed in the juvenile vehicle seat to align the child-support base of the seat shell in closely confronting relation to the seat bottom and the seat back of the juvenile vehicle seat in the child-seating space formed in the juvenile vehicle seat to establish an aligned position of the child-support base of the seat shell of the infant carrier relative to the juvenile vehicle seat, and a second shell anchor coupled to an opposite second side of the child-support base and arranged to extend into the second anchor receiver formed in the second side wall of the juvenile vehicle seat when the infant carrier is placed in the predetermined position in the child-seating space formed in the juvenile vehicle seat to retain the child-support base of the seat shell in the aligned position,
wherein the child-support base includes a seat bottom that is aligned in closely confronting relation to the seat bottom of the juvenile vehicle seat when the child-support base is retained in the aligned position and a seat back that is aligned in closely confronting relation to the seat back of the juvenile vehicle seat when the child-support base is retained in the aligned position, and the first and second shell anchors are coupled to the seat back of the child-support base, and
wherein the child-support base further includes separate first and second upper rails and separate first and second lower rails, the first shell anchor is coupled to the first upper and lower rails, and the second shell anchor is coupled to the second upper and lower rails.

11. The child restraint system of claim 10, wherein the first lower rail, the second lower rail, and the seat bottom and seat back of the child-support base cooperate to form a monolithic component.

12. The child restraint system of claim 11, wherein an upper end of the first upper rail is coupled to one side of the seat back of the child-support base, a lower end of the first upper rail is coupled to an upper end of the first lower rail, and portions of the first slidable plunger extend through aligned apertures formed in the first upper and lower rails.

13. The child restraint system of claim 12, wherein an upper end of the second upper rail is coupled to one side of the seat back of the child-support base, a lower end of the second upper rail is coupled to an upper end of the second lower rail, and portions of the second slidable plunger extend through aligned apertures formed in the second upper and lower rails.

14. A child restraint system comprising
a juvenile vehicle seat adapted to rest on a passenger seat in a vehicle, the juvenile vehicle seat including a seat bottom, a seat back arranged to extend upwardly away from the seat bottom, a first side wall coupled to one side of the seat bottom and back and formed to include a first anchor receiver, and a second side wall coupled to an opposite second side of the seat bottom and back and formed to include a second anchor receiver, the first and second side walls being arranged to lie in spaced-apart relation to one another to form a child-seating space therebetween, and
an infant carrier including a seat shell and a carrying handle coupled to the seat shell, the seat shell including a child-support base, a first shell anchor coupled to a first side of the child-support base and arranged to extend into the first anchor receiver formed in the first side wall of the juvenile vehicle seat when the infant carrier is placed in a predetermined position in the child-seating space formed in the juvenile vehicle seat to align the child-support base of the seat shell in closely confronting relation to the seat bottom and the seat back of the juvenile vehicle seat in the child-seating space formed in the juvenile vehicle seat to establish an aligned position of the child-support base of the seat shell of the infant carrier relative to the juvenile vehicle seat, and a second shell anchor coupled to an opposite second side of the child-support base and arranged to extend into the second anchor receiver formed in the second side wall of the juvenile vehicle seat when the infant carrier is placed in the predetermined position in the child-seating space formed in the juvenile vehicle seat to retain the child-support base of the seat shell in the aligned position,
wherein the seat shell further includes a side wall coupled to the child-support base to form a child-receiving cavity in the infant carrier, the side wall includes a semi-soft first side panel coupled to a first end of the carrying handle and located alongside a first side of the child-support base and a semi-soft second side panel coupled to a second end of the carrying handle and located along a second side of the child-support base.

* * * * *